United States Patent [19]

Sato et al.

[11] 4,123,123

[45] Oct. 31, 1978

[54] METHOD AND APPARATUS FOR FIXING GLOVE TO GLOVE BOX AND GLOVE SUITABLE THEREFOR

[75] Inventors: Shunichi Sato, Hitachi; Midori Kawasaki, Katsuta; Mamoru Kunii, Tokyo, all of Japan

[73] Assignee: Kubushiki Kaisha Kokugo, Tokyo, Japan

[21] Appl. No.: 664,357

[22] Filed: Mar. 5, 1976

[30] Foreign Application Priority Data

Mar. 28, 1975 [JP] Japan .............................. 50-41631[U]

[51] Int. Cl.$^2$ ...................... A61G 11/00; A41D 27/10
[52] U.S. Cl. .......................................... 312/1; 2/270
[58] Field of Search ...................... 312/1; 2/270, 200

[56] References Cited

U.S. PATENT DOCUMENTS

| | | | |
|---|---|---|---|
| 1,642,577 | 9/1927 | Carson | 312/1 |
| 2,842,773 | 7/1958 | Trexler | 312/1 |
| 3,099,015 | 7/1963 | Renehan | 312/1 X |
| 3,140,495 | 7/1964 | Gottwik | 312/1 X |
| 3,323,846 | 6/1967 | Boddy | 312/1 X |
| 3,396,701 | 8/1968 | Trexler | 312/1 |
| 3,492,987 | 2/1970 | Parker | 312/1 |

*Primary Examiner*—Mervin Stein
*Assistant Examiner*—Victor N. Sakran
*Attorney, Agent, or Firm*—Wenderoth, Lind & Ponack

[57] ABSTRACT

A method and an apparatus for fixing a glove to a glove box and a glove suitable therefor are provided. A glove having an extended fin portion at its proximal end is fitted around a cylinder forming a handling hole of the glove box such that the fin portion of the glove envelops the cylinder, and a fixing ring is secured around the fin portion of the glove fitted on the cylinder. The fin portion of the glove is folded back outwardly so as to enclose the fixing ring at the fold to thereby forming the overlapping fin portions. These overlapping portions of the glove are then securely fastened to the cylinder by a clamping ring.

3 Claims, 7 Drawing Figures

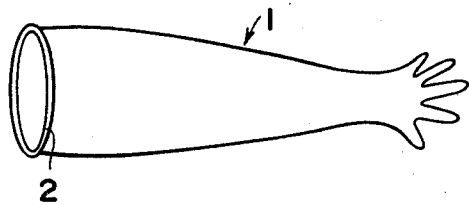
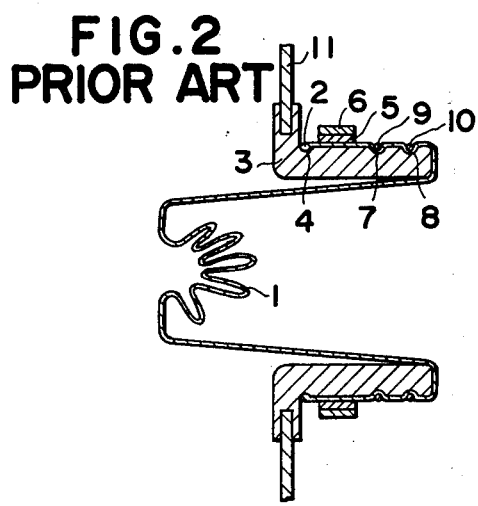
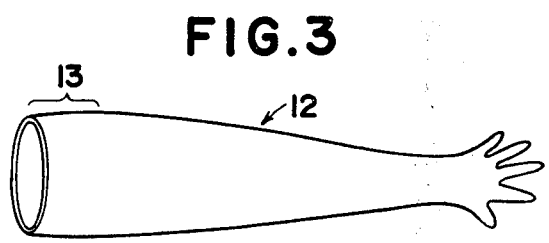
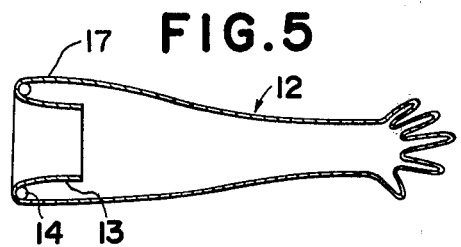
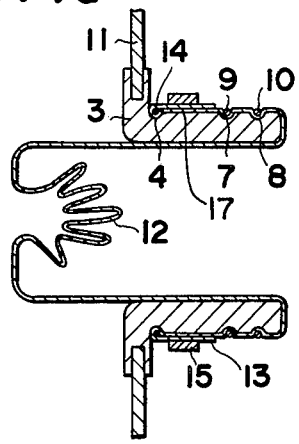
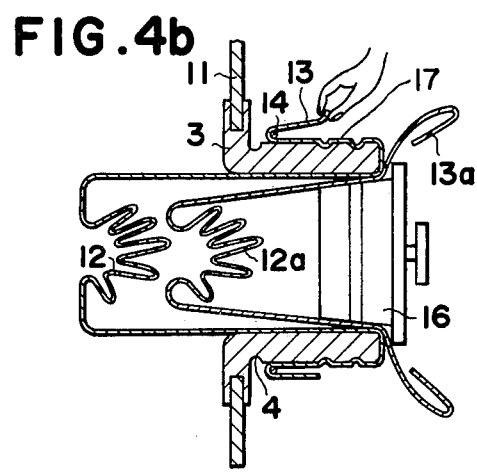
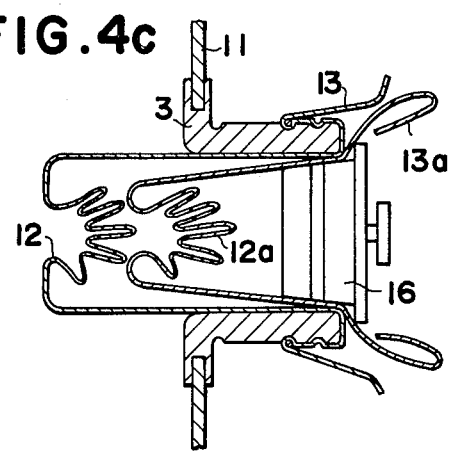

METHOD AND APPARATUS FOR FIXING GLOVE TO GLOVE BOX AND GLOVE SUITABLE THEREFOR

BACKGROUND OF THE INVENTION

This invention relates to novel techniques for securely fixing a glove to a glove box used for handling a relatively small amount of radioactive material.

A glove box is widely used for handling a relatively small amount of radioactive material. Such glove box is provided with an opening called handling hole, and a hollow cylinder called a glove port is disposed around said handling hole so as to project out from the box. When handling radioactive material in the box, the proximal end of the usually rubber-made glove is secured around the cylinder, then the finger-shaped portions at the distal end of the glove are forced into the glove body portion manually, and the operator's hand is inserted into the glove.

There has been generally used a glove 1, such as shown in FIG. 1, having a bead portion 2 formed by rounding and thickening the proximal end of the glove for facilitating fitting and fixing of the glove to the glove port. In use of such glove, first the bead portion 2 of the glove 1 is elastically fitted in a groove 4 formed circumferentially in the outer surface of the glove port cylinder 3, and then the thus fixed glove is further fastened from above thereof by a metal clamp 6 through a rubber packing 5, as shown in FIG. 2, thereby to secure the glove to the cylinder 3. If desired, O-rings 9 and 10 are also adapted on the glove and tightened into the respective grooves 7 and 8 in the cylinder surface to ensure secure fixing of the glove to the glove port. For changing the thus fixed glove, first the metal clamp 6 and rubber packing 5 are removed, then the bead portion 2 is separated from the groove 4 by hitching said portion with a driver or like means, and then this portion is directly pinched by the operator's fingers and turned back to thereby detach the glove from the cylinder. Such operation, however, is not only low in working efficiency but also involves the danger of causing radioactive contamination of the operator's fingers since the glove bead portion is usually contaminated with radioactive materials. Further, the rubber packing 5 is required to remove the damage on the fastened portion of the glove by the metal clamp 6, which fastens the glove fitted on the cylinder for securing the end portion of the glove to the cylinder. The possiblity of radioactive contamination is a particularly serious problem.

SUMMARY OF THE INVENTION

It is therefore an object of this invention to provide an improved glove and a method for securely fixing the glove to a glove box, which method is capable of eliminating the defects of the prior art described hereinbefore and is also capable of minimizing the danger of radioactive contamination.

It is another object of this invention to provide a method for fixing a glove to a glove box, which method permits easy exchange of the glove and can improve durability of the glove.

It is still another object of the present invention to provide an apparatus for securely fixing a glove to a glove box, which apparatus is capable of improving safety and workability for exchange of the glove.

It is a further object of this invention to provide a glove which is suited for use in the above-described method and apparatus of this invention.

Briefly, according to the conception of the present invention, a glove having an extended fin portion at its proximal end is fitted around a cylinder forming a handling hole of the glove box such that the fin portion of the glove envelops the cylinder, and a fixing ring is secured around the fin portion of the glove fitted on the cylinder. The fin portion of the glove is folded back outwardly so as to enclose the fitting ring at the fold to thereby form the overlapping fin portions, and then these overlapping portions of the glove are securely fastened to the cylinder by a clamping ring. Thus, the present invention proposes the use of a glove having an extended fin portion at its proximal end.

DESCRIPTION OF THE DRAWINGS

FIG. 1 is a perspective view of a conventional glove according to the prior art;

FIG. 2 is a sectional view showing the mode of fixing the conventional glove to a glove box;

FIG. 3 is a perspective view of a preferred form of the glove of the present invention;

FIGS. 4a to 4c are sectional views illustrating the glove fixing and exchanging method according to the present invention; and FIG. 5 is a sectional view showing a modification of the glove of FIG. 3 where a fixing ring is beforehand attached to the glove.

DETAILED DESCRIPTION OF THE PREFERRED EMBODIMENTS

The present invention is now described in detail by way of preferred embodiments thereof as illustrated in the accompanying drawings.

Generally, a handling hole in the glove box is formed, as shown in FIG. 2, by a cylinder 3 fitted in a hole in a lead glass plate or a plastic plate 11 which constitutes one side wall of the box, and usually a plural number (for example three) of grooves 4, 7, 8 are formed in the outer peripheral surface of the cylinder.

In the present invention, there is used a glove 12 which is usually made of synthetic rubber such as Neoprene, Hypalon, Neoprene containing lead therein, and the like, and has at the proximal end of the main body portion thereof an extended fin portion 13 such as shown in FIG. 3. For fixing this glove 12 to the glove box, first the fin portion 13 of the glove is elastically set deeply on the cylinder 3 as shown in FIG. 4a. The left side on the drawing corresponds to the inner side of the glove box and the right side corresponds to the outer side of the glove box. Then a fixing ring 14 is secured on the glove main portion 17 fitted on the cylinder 3. Preferably, this ring 14 is an elastic ring made of, for example, the same material as the glove. The fixing ring 14 set around the main portion 17 of the glove is tightened into a groove 4 formed in the outer surface of the cylinder 3 to provide tight and secure fixing. Then the fin portion 13 of the glove is turned back outwardly, that is, in the direction separating from the box, so as to envelope the fixing ring 14 at the bend while forming overlapping portions around the cylinder 3 and the main portion 7. These overlapping portions are secured to the outer periphery of the cylinder 3 by means of a clamping ring 15. If necessary, O-rings 9, 10 may be additionally adapted on said portions and tightened into the corresponding grooves 7, 8 in the outer peripheral surface of the cylinder 3 to ensure securer fixing of the glove to the cylinder.

Thus, according to the present invention, as a clamping ring 15 is applied and tightened over the overlapping parts of the folded back fin portion 13 of the glove over the main portion 17 to secure the glove to the cylinder 3, tight and secure fixing can be attained with no need of using any specific rubber packing.

In the above-described embodiment, the fixing ring 14 is adapted after fitting the main portion 17 of the glove on the cylinder, and then the fin portion 13 is folded back, but it is also possible to have the elastic ring 14 previously attached on the inside at the end portion of the glove as shown in FIG. 5. In this case, the fin portion 13 is beforehand folded back inwardly of the glove to form the overlapping portions, and under this condition, the glove is inserted into the box from its finger end to a middle point of the glove, and then while spreading out the elastic ring 14, the glove portion exposed outside of the box is turned inside out, and then the elastic ring 14 is tightened into the groove 4 in the outer periphery of the cylinder 3 (see glove 12a in FIG. 4b). In the glove shown in FIG. 5, the elastic ring 14 may be formed integral with the glove 12.

Exchange of the glove can be accomplished in the following way. As shown in FIG. 4b, a new glove 12a is inserted into the handling hole, and while retaining this glove by a handling hole closing bung 16, the clamping ring 15 is removed. Then the operator pinches the folded back fin portion 13 and pulls it out. After the fin portion 13a at the proximal end of the new glove 12a is fixed to the cylinder in the same way as described above in connection with the embodiment shown in FIG. 4a, and then the bung 16 is drawn out from the handling hole, the used glove is taken off into the inside of the glove box by jerking it into.

According to the present invention as described above, glove exchange can be accomplished with ease by merely pulling the fin portion of the glove, so that workability is greatly improved. A marked improvement is also ensured in safety of operation since there is no possibility that the operator's fingers be directly touched to the contaminated parts. Further, since the overlapping fin portions of the glove are securely clampd by a metal clamp, no rubber packing is necessitated and also durability of the glove is enchanced.

What is claimed is:

1. A glove to be attached to a glove box which has a tube opening extending outside said glove box for access thereinto, said glove comprising:
    a glove body fitted through said tube opening and having a main portion fitted around the outside of said tube opening;
    fixing ring means integrally formed with and surrounding said main portion of said glove body for securing said main portion of said glove body to said tube opening;
    said glove body further having an extended fin portion integrally formed with and extending from said main portion, said fin portion extending around and covering said fixing ring means and overlapping said main portion; and
    a clamping ring means fitted around the outside of said extended fin portion overlapped against main portion, whereby said glove body is secured to said tube opening by both said fixing ring means and said clamping ring means.

2. A glove as claimed in claim 1 wherein said fixing ring means is elastic.

3. A glove as claimed in claim 1, wherein said glove body is comprised of synthetic rubber.

* * * * *

UNITED STATES PATENT AND TRADEMARK OFFICE
CERTIFICATE OF CORRECTION

PATENT NO. : 4,123,123
DATED : October 31, 1978
INVENTOR(S) : Shunichi Sata, Midori Kawasaki and Mamoru Kunii It is certified that error appears in the above-identified patent and that said Letters Patent are hereby corrected as shown below:

In the heading No. [73] change the name of the Assignee from "Kubushiki Kaisha Kokugo, Tokyo, Japan to --Doryokuro Kakunenryo Kaihatsu Jigyodan and Kubushiki Kaisha Kokugo , both of Tokyo, Japan, part interest each --.

Signed and Sealed this

Twenty-first Day of August 1979

[SEAL]

Attest:

Attesting Officer

LUTRELLE F. PARKER
Acting Commissioner of Patents and Trademarks